(12) United States Patent
Shah et al.

(10) Patent No.: US 12,153,888 B2
(45) Date of Patent: Nov. 26, 2024

(54) MULTI-TASK TRIPLET LOSS FOR NAMED ENTITY RECOGNITION USING SUPPLEMENTARY TEXT

(71) Applicant: Target Brands, Inc., Minneapolis, MN (US)

(72) Inventors: Shalin S. Shah, Sunnyvale, CA (US); Ryan Siskind, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 330 days.

(21) Appl. No.: 17/704,855

(22) Filed: Mar. 25, 2022

(65) Prior Publication Data

US 2022/0391590 A1 Dec. 8, 2022

Related U.S. Application Data

(60) Provisional application No. 63/193,051, filed on May 25, 2021.

(51) Int. Cl.
*G06F 40/295* (2020.01)
*G06F 40/117* (2020.01)
*G06N 3/08* (2023.01)

(52) U.S. Cl.
CPC .......... *G06F 40/295* (2020.01); *G06F 40/117* (2020.01); *G06N 3/08* (2013.01)

(58) Field of Classification Search
None
See application file for complete search history.

(56) References Cited

U.S. PATENT DOCUMENTS

| 2015/0095017 | A1 | 4/2015 | Mnih et al. | |
| 2020/0065374 | A1 | 2/2020 | Gao et al. | |
| 2021/0081614 | A1* | 3/2021 | Kakadiya | G06N 5/025 |
| 2021/0110811 | A1* | 4/2021 | Joseph | G10L 13/08 |

FOREIGN PATENT DOCUMENTS

| CN | 109711366 | * | 5/2019 | ........... G06N 18/214 |
| CN | 110569506 | * | 12/2019 | ............... G06N 3/04 |
| CN | 112734031 | * | 4/2021 | ............. G06F 30/02 |

(Continued)

OTHER PUBLICATIONS

Devlin, Jacob et al., BERT: Pre-training of Deep Bidirectional Transformers for Language Understanding, Dated May 24, 2019, 16 Pages.

(Continued)

*Primary Examiner* — Quynh H Nguyen
(74) *Attorney, Agent, or Firm* — Merchant & Gould P.C.

(57) ABSTRACT

Methods and systems for performing named entity recognition are disclosed. One method includes using a multi-task approach to fine-tune a neural network to perform named entity recognition. A multi-task objective function can include a combination of a triplet loss and a named entity recognition loss. The triplet loss can include the use of supplementary texts. The method further includes using the fine-tuned neural network to identify one or more named entities in a text. Aspects of the disclosure also include integrating named entity recognition with one or more other natural language processing tasks.

26 Claims, 9 Drawing Sheets

(56) References Cited

FOREIGN PATENT DOCUMENTS

JP 5178347 B2 * 4/2013 ............. G06F 17/30
WO 2020252950 A1 12/2020

OTHER PUBLICATIONS

Hoffer, Elad et al., Deep Metric Learning Using Triplet Network, Dated Dec. 4, 2018, 8 Pages.
Li, Jing et al., A Survey on Deep Learning for Named Entity Recognition, Dated Mar. 18, 2020, 20 Pages.
Miftahutdinov, Zulfat et al., Drug and Disease Interpretation Learning with Biomedical Entity Representation Transformer, Dated Jan. 22, 2021, 15 Pages.
Peng et al., An Emperical Study of Multi-Task Learning on BERT for Biomedical Text Mining, National Library of Medicine, National Institutes of Health, Bethesda, MD, Dated Jul. 9, 2020, 10 Pages.
Ruder, Sebastian, An Overview of Multi-Task Learning in Deep Neural Networks, Insight Centre for Data Analytics, NYI Galway, Aylien Ltd., Dated Jun. 15, 2017, 14 Pages.
Schroff, Florian et al., FaceNet: A Unified Embedding for Face Recognition and Clustering, Dated Jun. 17, 2015, 10 Pages.
Zhang, Qi et al., A Multi-Task Learning Framework for Extracting Bacteria Biotope Information, Zhejiang University, Alibaba DAMO Academy, Dated Nov. 4, 2019, 5 Pages.
Zhang, Le et al., BERT has a Mouth, and it can Taste: Identifying Points of Interest using BERT with Triplet Loss, Dated 2019, 6 Pages.
Zhao, Chen et al., Multi-task Learning for Product Information with Fine-tuned BERT, Rakuten Institute of Technology, Rakuten Inc., Dated 2020, 4 Pages.

* cited by examiner

MULTI-TASK TRIPLET LOSS FOR NAMED ENTITY RECOGNITION USING SUPPLEMENTARY TEXT

CROSS-REFERENCE TO RELATED APPLICATIONS

The present application claims priority form U.S. Provisional Patent Application No. 63/193,051, filed on May 25, 2021, the disclosure of which is hereby incorporated by reference in its entirety.

BACKGROUND

Named Entity Recognition (NER) is the task of locating and classifying entities in text. The entities, which can be one or more words, can be classified as belonging to a category. For example, NER can include identifying a person, location, or time in a text. Depending on the use case, the categories may vary. For example, in some use cases, NER could be used to identify colors, numbers, food, foreign language words, money, or other categories in text. Using NER to classify one or more entities in a text can be useful, for example, in performing tasks related to natural language processing (NLP) or artificial intelligence.

There are various challenges in NER. For example, words can have different meanings depending on the context in which they are used, text can be unstructured or be in an unexpected structure, and successful NER in one domain may not translate to success in another domain. In the retail industry, for example, it may be of interest to identify an item in text. For retail item data, however, there exist many different forms of text, such as the title of an item, descriptions of an item, and reviews of the item. The various forms of text related to retail item data can be semantically different from one another. For example, a title of an item may not be a well-formed sentence, a description of an item may include well-formed sentences, and item reviews may or may not be made up of well-formed sentences or phrases. Accordingly it may be difficult, because of varying textual structures and other reasons, to accurately identify named entities, such as items or other named entities, across different forms of text. Nevertheless, in some instances, it may be of interest to use NER to identify entities in various texts.

SUMMARY

In general, the subject matter of the present disclosure relates to fine-tuning a pre-trained neural network to perform named entity recognition. In particular, the subject matter of the present disclosure relates to optimizing a multi-task objective function that combines a triplet loss and a named entity recognition loss to fine-tune a neural network for named entity recognition.

In an example aspect, a method includes receiving object data including a plurality of object titles and a plurality of supplementary object text records, fine-tuning, using the object data, a neural network to perform named entity recognition, receiving a text input comprising a plurality of words, and classifying, using the trained neural network, one or more words of the plurality of words. Fine-tuning the neural network to perform named entity recognition includes determining a triplet loss, determining a named entity recognition loss, and optimizing a multi-task objective function comprising the triplet loss and the named entity recognition loss.

In a second aspect, a natural language processing service comprises a named entity tagger and a natural language processing subsystem communicatively coupled with the named entity tagger. The named entity tagger includes a processor and a memory storing instructions. The instructions, when executed by the processor, cause the named entity tagger to: receive object data including a plurality of object titles and a plurality of supplementary object text records; fine-tune, using the object data, a neural network to perform named entity recognition; receive a text input comprising a plurality of words; classify, using the trained neural network, one or more words of the plurality of words; and output, to the natural language processing subsystem, a classification of the one or more words. Fine-tuning the neural network to perform named entity recognition includes determining a triplet loss, determining a named entity recognition loss, and optimizing a multi-task objective function comprising the triplet loss and the named entity recognition loss.

In a third aspect, a method for training a neural network to detect items in text is disclosed. The method includes receiving item data including a plurality of item titles and a plurality of item descriptions; generating embeddings, using the neural network, for each item title of the plurality of item titles and for each item description of the plurality of item descriptions; applying a triplet loss function to each of the plurality of item titles to obtain a triplet loss. Obtaining a triplet loss includes, for each item title: calculating a first cosine similarity between an embedding associated with the item title and an embedding associated with an item description of the plurality of item descriptions that is associated with the item title; calculating a second cosine similarity between the embedding associated with the item title and an embedding associated with an item description of the plurality of item descriptions that is not associated with the item title; determining a difference between the first cosine similarity and the second cosine similarity by subtracting the second cosine similarity from the first cosine similarity; and applying a sigmoid function to the difference between the first cosine similarity and the second cosine similarity. The method further includes determining, using the embeddings and the item data, a named entity recognition loss; and optimizing a multi-task objective function comprising the triplet loss and the named entity recognition loss.

DETAILED DESCRIPTION

Figure 1:
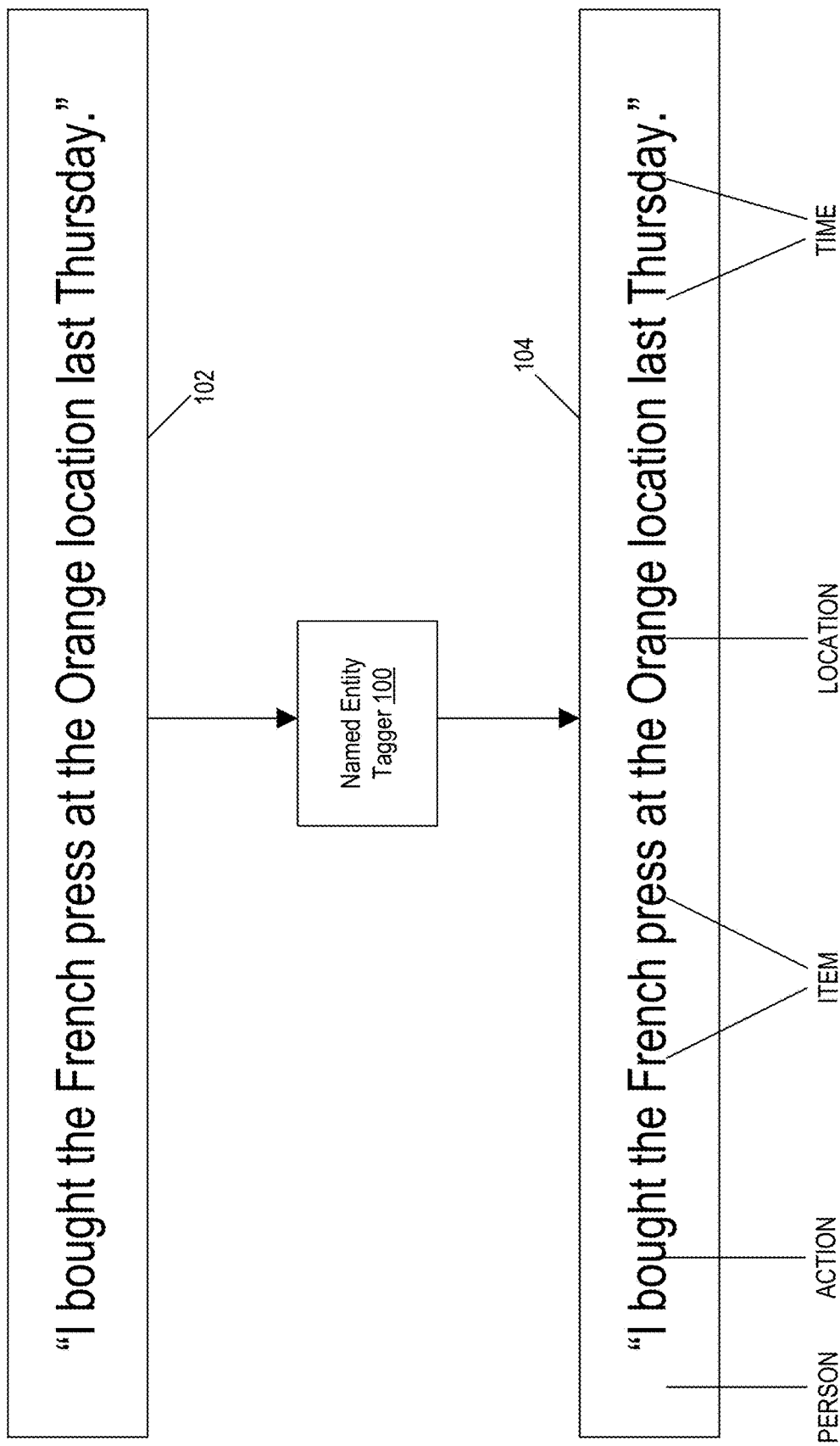
FIG. 1 illustrates an example named entity tagger performing named entity recognition on example text.

Embodiments of the present disclosure relate to a named entity tagger that fine-tunes a base neural network to perform named entity recognition (NER). To use a neural network for named entity recognition, aspects of the present disclosure can use word embeddings. Word embeddings can be real-valued vector representations of one or more words. When graphed, word embeddings representing words with similar meaning can be relatively closer together than word embeddings representing words with unrelated meanings. Additionally, aspects of the present disclosure may use sentence embeddings, which can be real-valued vector representations of one or more sentences.

In some embodiments, the base neural network used by the named entity tagger can include Google's Bidirectional Encoder Representations from Transformers (BERT). BERT is a neural network useable for a variety of natural language processing tasks. BERT, like all neural networks, must train before it can be used for inference. BERT's training can include two steps: pretraining and fine-tuning. During pretraining, BERT's millions of parameters can be trained on large amounts of text. As a result of pretraining, BERT understands the context in which words are used and adjusts their embeddings accordingly. For example, after going through BERT, the embedding for the word "bank" will differ depending on whether it is used in the context of a river or a financial institution. These context-adjusted embeddings produced by BERT can then be used in natural language processing tasks, such as NER.

In example aspects, the second step of BERT training is fine-tuning. During fine-tuning, BERT can be incorporated into a specific natural language processing task, such as NER. Fine-tuning for NER can include adding a layer that receives BERT's output (which can include contextualized word embeddings) and that predicts, for example by using a Softmax layer, a probability that a word belongs to a category. This BERT-based NER model can then be further trained to improve this prediction, for example by adjusting parameters to minimize an error between a predicted and an actual classification of one or more words.

Example aspects of the present disclosure can use multitask learning to improve fine-tuning of BERT for NER. For example, rather than training the BERT-based NER model to only perform the NER classification task, some embodiments of the present disclosure can also train the BERT-based model to perform a triplet loss task.

The triplet loss can be, for example, a function with three inputs: an anchor, a true input, and a false input. The anchor may relate to an object that is a named entity. For example, the anchor may be an item name, the true input may be a description of the item, and the false input may be a description of an unrelated item. The descriptions can come, for example, from a product catalog or from a website that includes text related to the object. When the inputs are embeddings, the goal of triplet loss may be to minimize the distance between the anchor and the true input and to maximize the distance between the anchor and the false input. Thus, when using a triplet loss to update a neural network, the weights of the neural network can be adjusted so that the embeddings representing the anchor and the true input are adjusted to be more similar and the embeddings representing the anchor and the negative input are adjusted to be more different. In aspects of the present disclosure, as part of fine-tuning the neural network, the named entity tagger can combine, in a form of multi-tasking, the triplet loss with the named entity recognition loss, and backpropagate the losses through the neural network to update the weights of the neural network.

After fine-tuning, the named entity tagger can be used for inference. For example, the named entity tagger can receive an input that is not part of the training data and that includes a plurality of words. The named entity tagger can use the trained neural network to classify one or more of the plurality words. In some embodiments, by training on both the NER task and the triplet loss task during fine-tuning, rather than only training on the NER task, the named entity tagger can more accurately perform the NER task during inference.

Certain embodiments of the present disclosure have numerous technical features that provide advantages over existing tools. For example, because the named entity tagger can integrate a BERT-based neural network, the named entity tagger can better understand the context in which words are used, resulting in improved accuracy and flexibility across texts. Furthermore, by leveraging information found in supplementary texts as part of a triplet loss, the named entity tagger can glean insights about named entities that would be more difficult to capture in a model that does not use supplementary texts. For example, in the retail context, the named entity tagger can leverage available text records that describe objects (e.g., item descriptions from catalogs) to more accurately identify and classify those objects in text during inference. Accordingly, the named entity tagger can, for example, more accurately and efficiently identify named entities when reading reviews, queries, comments, and other text.

Additionally, aspects of the present invention could be applied more broadly across NER by, for example, improving recognition of any entities that have related supplementary texts. Furthermore, aspects of the present disclosure can be integrated into a more general natural language processing tool, such as a tool that can generate responses to queries, determine a sentiment of text, or analyze information in text. As a result of aspects of the present disclosure, the named entity tagger can, in example embodiments, classify words with a higher precision, recall, accuracy, and percentage of exact matches than an NER model that relies on a BERT base alone. Thus, computing time can be saved, human intervention can be decreased, NER classifications can be more reliable, and performance of systems that use the named entity tagger can improve.

FIG. 1 illustrates an example named entity tagger 100 performing named entity recognition on example text 102, resulting in a classification 104. In the example of FIG. 1, the named entity tagger 100 has been trained to perform NER. In training to perform NER, the named entity tagger 100, as shown in the example of FIG. 1, can detect words belonging to one of the following categories: PERSON; ACTION; ITEM; LOCATION; and TIME. In other examples, the named entity tagger 100 can be trained to recognize other categories, including a category that includes words that may not belong to any other categories. Furthermore, in some embodiments, the named entity tagger 100 can recognize whether a word is part of a named entity that includes a series of words. In such embodiments, the named entity tagger 100 can tag the word as being, for example, the first word, a middle word, or the last word in the named entity. The named entity tagger 100 is further described below in connection with FIGS. 2-9.

The example text 102 can be any text. For example, the example text can be an article, a book, a query, a review, text taken from a website, a social media post, a transcribed oral statement, or any other form of text. The classification 104 can be data that indicates one or more classifications made by the named entity tagger 100 on the example text 102. The format of the classification 104 can vary depending on the embodiment. For example, the classification 104 can be a table, text string, data structure, image, or any other form required by a user or system that uses the named entity tagger 100. For instance, if the named entity tagger 100 outputs the classification 104 for to a user, then the classification 104 may be in the form of a text string with the relevant categories highlighted; as another example, if the named entity tagger 100 outputs the classification 104 to an analytics system or to a component of a natural language processing system, then the classification 104 may be in the form of a table, array, or data structure.

Figure 2:
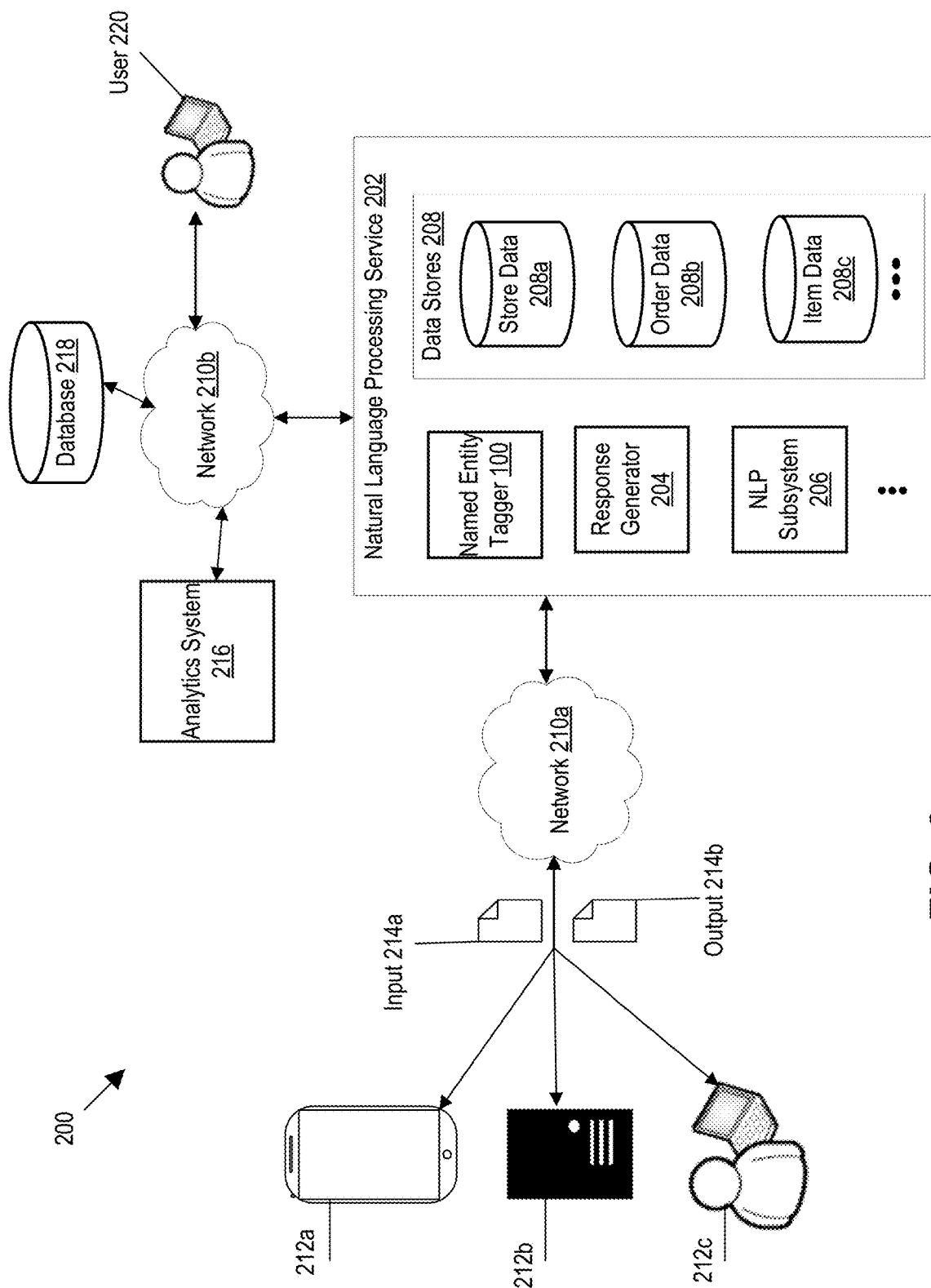
FIG. 2 illustrates a network in which aspects of the present disclosure can be implemented.

FIG. 2 illustrates a network 200 in which aspects of the present disclosure can be implemented. FIG. 2 illustrates, for example, an example system in which the named entity tagger 100 can be integrated. The network 200 can include a natural language processing service 202. The natural language processing service 202 can include the named entity tagger 100, a response generator 204, a natural language processing subsystem 206, a data store 208, and other components that relate to natural language processing. The data store 208 can include, for example, store data 208a, order data 208b, item data 208c, other retail-related data, and any other data related to the natural language processing service 202.

The natural language processing service 202 can, in some embodiments, provide natural language processing services that include named entity recognition, query response, sentiment analysis, or other services related to natural language processing. Within the natural language processing service 202, one or more of the components can be combined to perform one or more services. For example, the named entity tagger 100 can use information from the data stores 208 to classify words of the input 214a, and the named entity tagger 100 can output the classifications to the response generator 204 or to the other NLP subsystem 206, which can subsequently use the classifications produced by the named entity tagger 100 in a downstream NLP task. In another example, the named entity tagger 100 can output the classifications directly to a user. Furthermore, in some embodiments, the natural language processing service 202 can provide natural language processing services that are specific to retail, such as processing text related to products, stores, or orders.

In some embodiments, the natural language processing service 202 can be communicatively coupled, via a network 210a, with users 212a-c. The users 212a-c can include a mobile device user 212a, a computing system 212b, a desktop user 212c, and any other entity that can use the natural language processing service 202. The users 212a-c can, for example, transmit an input 214a to the natural language processing service 202. The input 214a can be, for example, a query, a review, an internet post, or any other text or collection of texts. The natural language processing service 202 can receive the input 214a and, depending on what type of input it is and depending on what type of entity sent the input 214a, the natural language processing service 202 can perform a natural language processing task. In some embodiments, the natural language processing service 202 can return an output 214b to one or more of the users 212a-c. The output 214b can be, for example, a response to a user query, analysis, a recommendation, or other information that may relate to the input 214a.

Furthermore, as shown in the example of FIG. 2, the natural language processing service 202 can be communicatively coupled, via a network 210b, with backend systems, which can include an analytics system 216, a database 218, and a user 220. In some embodiments, the natural language processing system 202 can transmit data to one or more of the backend systems. For example, upon processing an input 214a, which can include, for example, identifying named entities in the input 214a, performing sentiment analysis on the input 214a, or performing other natural language processing tasks, the natural language processing service 202 can transmit data related to the processing of the input 214a to one or more of the backend systems. The analytics system 216 can be, for example, a system that aggregates and analyzes data from the natural language processing system 202 and from other systems, and that outputs that data to user interfaces or to another system. The database 218 can be a database that is external to the natural language processing service 202 and that stores data generated by the natural language processing service 202. The user 220 can be, for example, a user that can directly access data generate by the natural language processing service 202 or that can manipulate one or more components of the natural language processing service 202.

As an example of a use of the named entity tagger 100, the input 214a can be, for example, a review of an item. For example, the input 214a may be a review written by a customer on a retail website. The review may state, for example, "I got the french press at the Orange store during the sale last week. It works well and looks good, but it is hard to clean." The natural language processing service 202 can receive this review, for example via the network 210a, and send the review to the named entity tagger 100. If successful, the named entity tagger 100 can, in some embodiments, correctly classify "french press," "it," and "it" as referring to an item. Furthermore, in some examples, having identified an item or another entity in the review or in other text, the named entity tagger 100 or another system can identify, specifically, that the entity referred to in the review is, for example, a particular item, such as a Bodum Brazil 3 Cup/12oz French Press. In some embodiments, the named entity tagger 100 may also recognize and classify other entities in the input 214a, such as recognizing that "Orange" refers to a store location.

Continuing with the example, the named entity tagger 100 can, having performed named entity recognition and identified entities, output the review—and the classification of entities within the review—to another system, such as another component of the natural language processing service 202 or to one of the backend systems 216-220. This output can then be used, for example, to analyze whether the review is positive or negative, to automatically generate a response if necessary, or to aggregate, analyze, or store reviews or other information related to the French press, the Orange store location, or another characteristic of the review. Thus, by accurately identifying entities in, for example, unstructured text such as product reviews or queries, the named entity tagger 100 can improve the accuracy of—and increase the amount of data available to—other natural language processing systems or analytics systems, thereby increasing, for example, the accuracy and applicability of such systems.

Each of the networks 210a-b can be, for example, a wireless network, a wired network, a virtual network, the Internet, or any other type of network. Furthermore, each of the networks 210a-b can be divided into subnetworks, and the subnetworks can be different types of networks or the same type of network. The example of FIG. 2 illustrates only one system in which the named entity tagger 100 can be implemented. In other examples, there can be more or less components than those illustrated in the example of FIG. 2.

Figure 3:
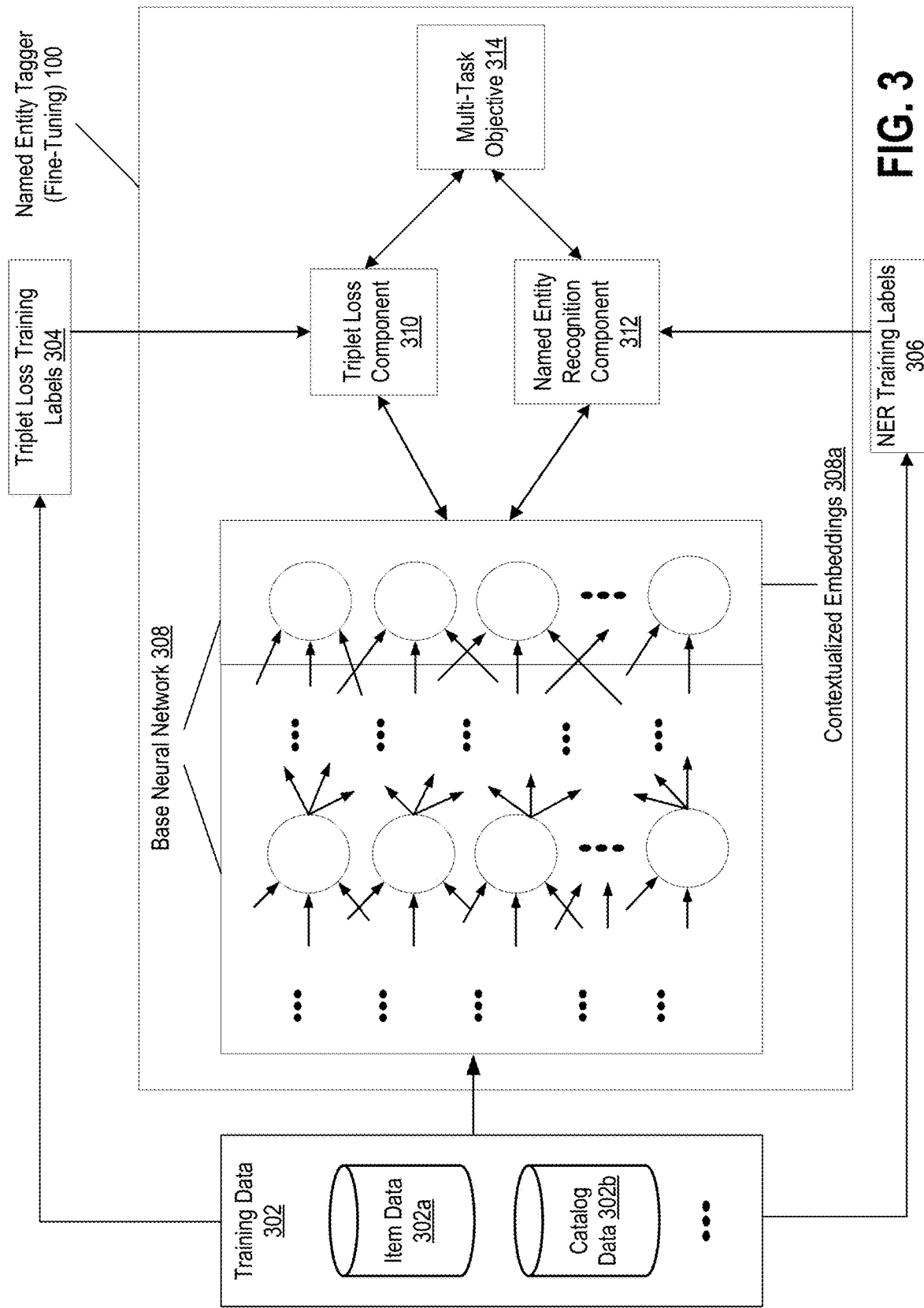
FIG. 3 illustrates a block diagram of training data and an example named entity tagger during fine-tuning.

FIG. 3 illustrates a block diagram of training data 302 and an example named entity tagger 100 during fine-tuning.

During fine-tuning, the named entity tagger 100 can include a base neural network 308, a triplet loss component 310, a named entity recognition component 312, and a multi-task objective 314. The training data 302 can include object data 302a, catalog data 302b, and other data used to fine-tune the named entity tagger 100. Furthermore, the triplet loss training labels 304 and the NER training labels 306 can come from the training data 302.

As described above, the base neural network 308 can include, for example, a BERT-based model. The neural network 308 can be pretrained to receive word embeddings and to alter the word embeddings depending on the context in which the words are used. A layer of the base neural network 308 can be a layer including contextualized word embeddings 308a. The contextualized word embeddings 308a can be determined by, for example, combining or concatenating one or more layers of the base neural network 308. The contextualized word embeddings 308a can be used in downstream tasks during fine-tuning, such as in the triplet loss component 310 or the named entity recognition component 312.

As is further described below in connection with FIGS. 4-6, the triplet loss component 310 and the named entity recognition component 312 can receive embeddings from the last layer of the base neural network 308. For example, the triplet loss component 310 can receive embeddings for an object, for a supplementary object text record that is associated with the object (e.g., a description of the object), and for a supplementary object text record that is not associated with object (e.g., a description of a different, unrelated object). Furthermore, the triplet loss component 310 can receive labels from the triplet loss training labels 304 that may, among other things, indicate, for example, which supplementary object text record is associated with the object and which supplementary object text record is not associated with the object. As is further described below, the triplet loss component 310 can use these embeddings to determine a triplet loss, which can include, for example, determining a difference between (1) a similarity between the embedding for the object and for the embedding of the supplementary object text record associated with the object and (2) a similarity between the embedding for the object and for the embedding of the object text record that is not associated with the object. In some embodiments, the triplet loss can be backpropagated through the base neural network 308, and in some embodiments the triplet loss can be transmitted to the multi-task objective 314. Furthermore, in some embodiments, the triplet loss can receive embeddings from the base neural network 308 for a plurality of objects and for a plurality of supplementary object text records, thereby allowing the triplet loss component 310 to determine a plurality of triplet losses and use the plurality of triplet losses to update the neural network in batches.

The named entity recognition component 312 can, in some embodiments, include a Softmax layer. Additionally, the named entity recognition component 312 can, in some embodiments, receive contextualized word embeddings from the base neural network 308. For example, the named entity recognition component 312 may receive a plurality of word embeddings, each of which represent a word, from the base neural network 308. Using the Softmax layer and these embeddings, the named entity recognition component 312 can determine, for each word, whether that word belongs to a predefined category. The predefined category can be, for example, a person, item, location, time, an unrecognized entity, or any other category. Furthermore, the named entity recognition component 312 can receive NER training labels 306 that can indicate, for example, the actual category that each word of the plurality of words belongs to. The named entity recognition component 312 can then, for example, determine a named entity recognition loss by determining a difference between predicted classifications of the words and actual classifications of the words. In some embodiments, the named entity recognition loss can then be backpropagated through layers of the named entity recognition component 312 and the base neural network 308 and, in some embodiments, the named entity recognition loss can be transmitted to the multi-task objective 314.

In some embodiments, as is further described below, the multi-task objective 314 can combine the losses determined by the triplet loss component 310 and the named entity recognition component 312. The multi-task objective 314 can, in some embodiments, seek to optimize a combination of the losses determined by the triplet loss component 310 and the named entity recognition component 312. As part of optimizing, the named entity tagger 100 can use gradient descent techniques or other iterative algorithmic approaches to update the neural network. Depending on the combination of the triplet loss and NER loss, the weights in the neural network of the named entity tagger 100 can be altered, thereby updating the neural network to reduce an error associated with a combination of the triplet loss function and the named entity recognition task. In some embodiments, the multi-task objective function can compare a result of the combination of the triplet loss and the named entity recognition loss to an expected result. An expected result can, for example, come from the training data 302. Based on a difference between the actual and expected result, for example, one or more weights in the neural network can be updated. In some embodiments, while updating the neural network, all the weights of the neural network may be not locked and therefore susceptible to change during backpropagation. In some embodiments, the multi-task objective 314 can include a linear combination of the triplet loss and the named entity recognition loss; in other embodiments, the multi-task objective 314 can combine the triplet loss and the named entity recognition loss in a non-linear way or can combine them with another function.

Figure 4:
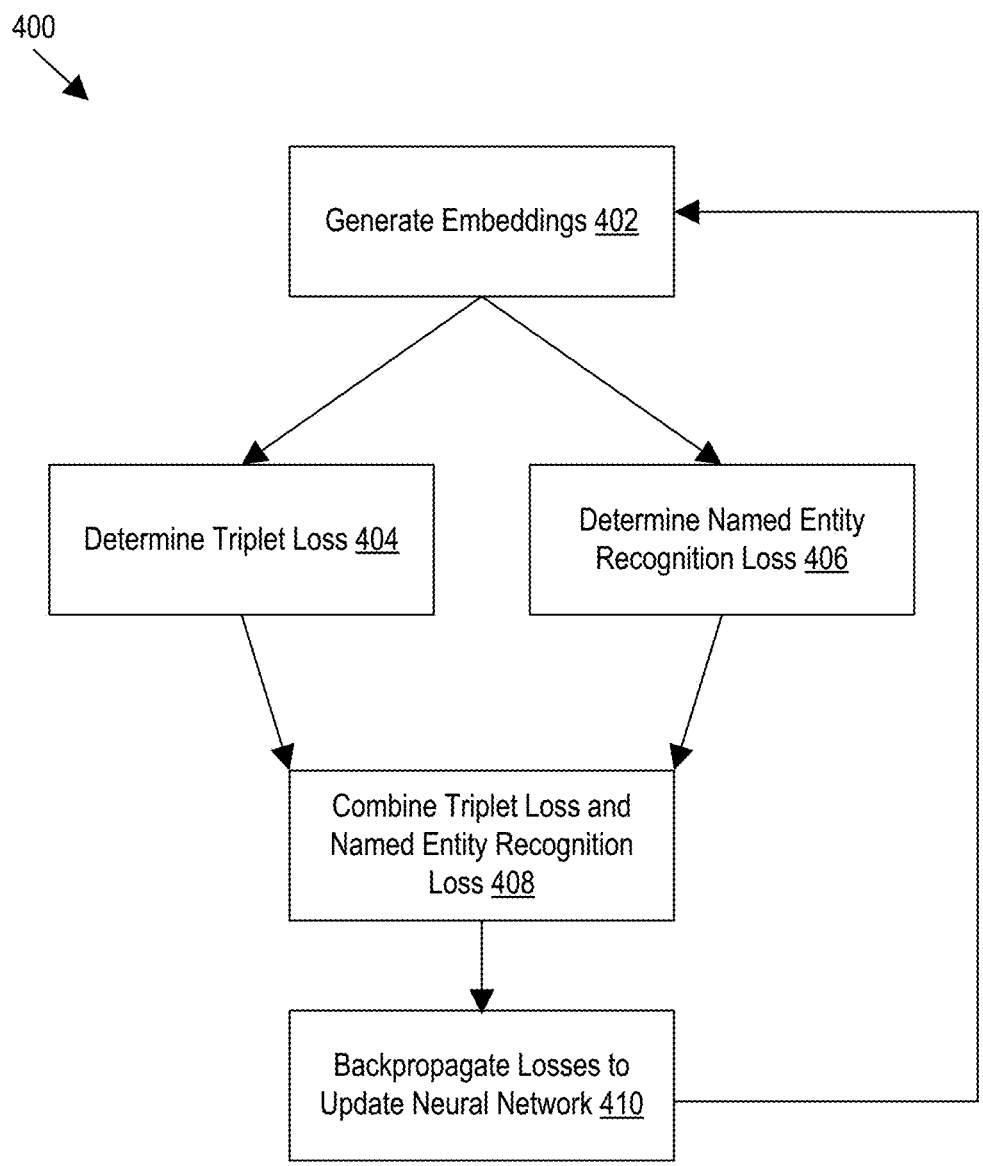
FIG. 4 is a flowchart illustrating an example method for fine-tuning a neural network.

FIG. 4 is a flowchart illustrating a method 400, an example method for fine-tuning a neural network. For example, the method 400 can be performed by components of the named entity tagger 100 of FIG. 3 or by a user of the named entity tagger 100 during fine-tuning. In the example shown, the method 400 can begin by generating embeddings (step 402). For example, the named entity tagger 100 can generate, using for example the base neural network 308, embeddings for one or more words, titles, text records, or other information of the training data 302. By passing through the base neural network 308, the embeddings can be altered so that they, among other things, incorporate the context in which the text that they represent is used.

In the example shown, the named entity tagger 100 can use the embeddings to determine a triplet loss (step 404). For example, the named entity tagger 100 can use embeddings associated with one or more object titles and embeddings associated with one or more supplementary object text records to determine a triplet loss. When updating the weights of the neural network during backpropagation, one goal in the multi-task objective can be, in the context of embeddings, to maximize the similarity of an object title and a supplementary object text record associated with that object title and to maximize the difference between an object title and a supplementary object text record that is not associated with the object title. Determining a triplet loss is further described below in connection with FIGS. 5-6.

In the example shown, the named entity tagger 100 can determine a named entity recognition loss (step 406). As described above in connection with FIG. 3, the named entity tagger 100 can, using word embeddings and a Softmax layer, predict one or more likelihoods that a word belongs to one or more categories. Additionally, the named entity tagger 100 can predict likelihoods for a plurality of words. Following these predictions, the named entity tagger 100 can determine a loss, which can be, for example, a cross-entropy loss that accounts for the differences between the predicted classifications of words and words' actual classifications, determined based on training data labels. When updating the weights of the neural network during backpropagation, one goal in the multi-task objective can be to minimize the difference between the predicted classifications and the actual classifications.

In the example shown, the named entity tagger 100 can combine the triplet loss and the named entity recognition loss (step 408). For example, the named entity tagger 100 may combine the triplet loss and the named entity recognition loss as part of a multi-task objective function, as described above in connection with FIG. 3.

In the example shown, the named entity tagger 100 can backpropagate the losses to update the neural network (step 410). For example, based on the triplet loss, the named entity recognition loss, and the multi-task objective, the named entity tagger 100 can update the weights of the neural network to minimize error. In some embodiments, particular weights or layers can be updated; in other embodiments, any weights or layers that contributed to one or more of the losses can be updated. In some embodiments, the named entity tagger 100 can update the neural network in batches, by, for example, accounting for a plurality of losses when backpropagating. After backpropagating losses, the named entity tagger 100 can, in some embodiments, generate embeddings for more object data (e.g., returning to step 402). In some examples, the named entity tagger 100 can continue the method 400 until a certain amount of object data has been used, until the object data has been used in a certain number of epochs, until a learning rate is sufficiently small, or until another metric is reached.

Figure 5:
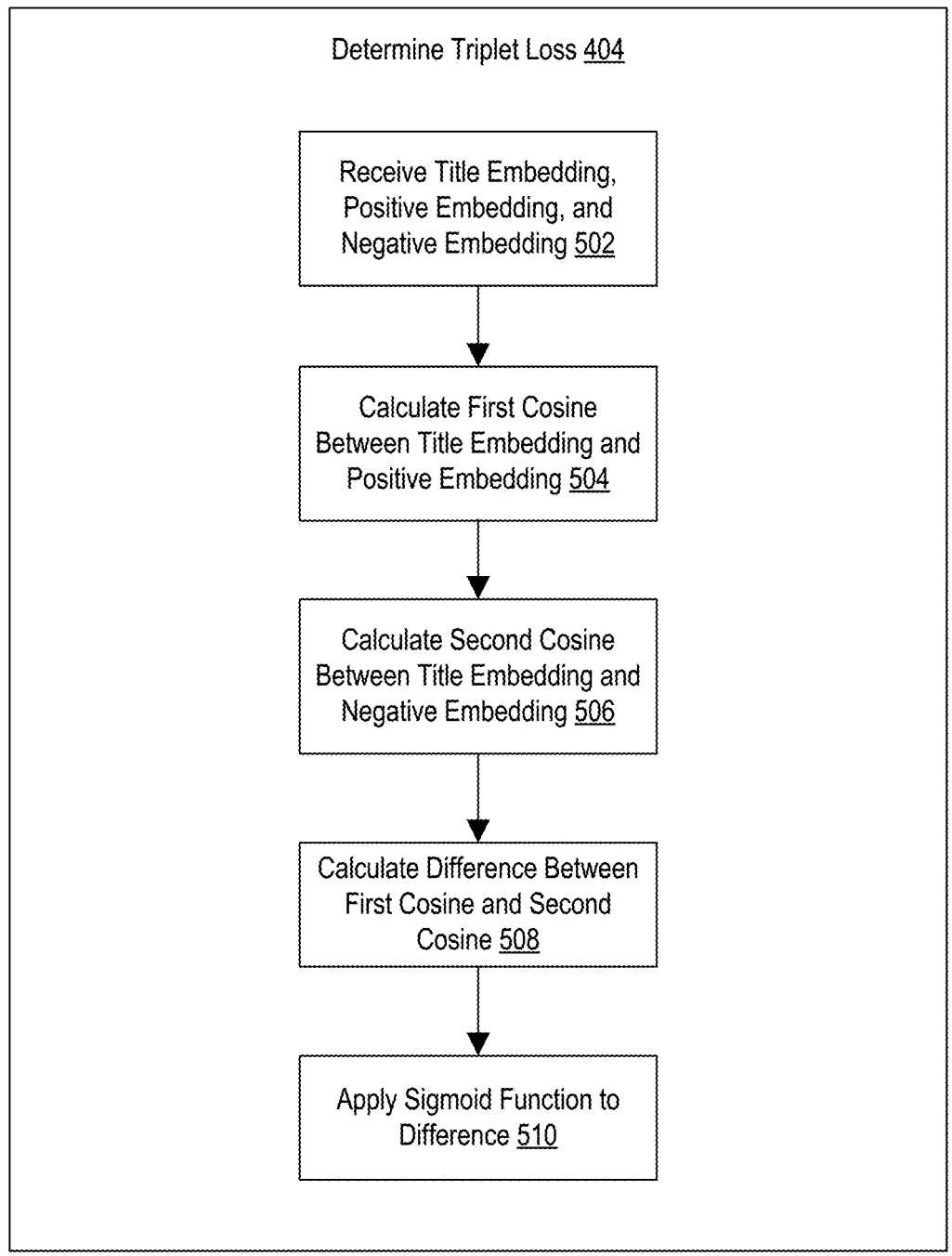
FIG. 5 is a flowchart illustrating an example method for determining a triplet loss.

FIG. 5 is a flowchart illustrating an example method 500 for determining a triplet loss. In some embodiments, the method 500 can be performed by the triplet loss component 310 or by another component of the named entity tagger 100 during fine-tuning. In the example shown, the method 500 can begin by receiving a title embedding, a positive embedding, and a negative embedding. In some embodiments, the positive embedding can be a true input of a triplet loss function. For example, the positive embedding can be associated with a supplementary object text record that is a description of the object represented by the title embedding. The negative embedding can be, for example, a false input of a triplet loss function. For example, the negative embedding can be a supplementary object text record that is associated with a description that does not describe the object represented by the title embedding. For example, the negative embedding can be associated with a randomly selected description. Furthermore, in some embodiments, the named entity tagger 100 can receive a plurality of title embeddings associated with a plurality of object titles and a plurality of embeddings associated with supplementary object text records.

As used in the following equations, let $t_i$, be the title embedding of the $i^{th}$ title and let $d_p$ and $d_n$ be sentence embeddings associated with two descriptions, where $d_p$ is the description of the $i^{th}$ item under consideration and $d_n$ is a randomly chosen description of a negative item.

In the example shown, a first cosine similarity, $c_p$, between the title embedding and the positive embedding can be calculated (step 504), as illustrated in equation (1):

$$c_p = \text{cosine}(t_i, d_p) \quad (1)$$

In the example shown, a second cosine similarity, $c_n$, between the title embedding and the negative embedding can be calculated (step 506), as illustrated in equation (2):

$$c_n = \text{cosine}(t_i, d_n) \quad (2)$$

In the example shown, a difference, $d_i$, between the first cosine similarity and the second cosine similarity can be calculated (step 508), as illustrated in equation (3). When optimizing, one objective can be to maximize $d_i$.

$$d_i = c_p - c_n \quad (3)$$

In the example shown, a sigmoid function can be applied to the difference $d_i$ (step 510), resulting in a loss $\mathcal{L}$, as illustrated in equation (4):

$$\mathcal{L} = \frac{e^{d_i}}{1 + e^{d_i}} \quad (4)$$

In some embodiments, the loss $\mathcal{L}$ can then be used in a multi-task setting with the named entity recognition loss, as described above in connection with FIGS. 3-4. In some embodiments, other equations than those illustrated in connection with FIG. 5 can be used. For example, rather than calculating a cosine similarity in connection with Step 504 and Step 506 a different way to calculate a similarity can be used. Furthermore, rather than using a sigmoid function, a different function with characteristics similar to a sigmoid function can be used in Step 510.

Figure 6:
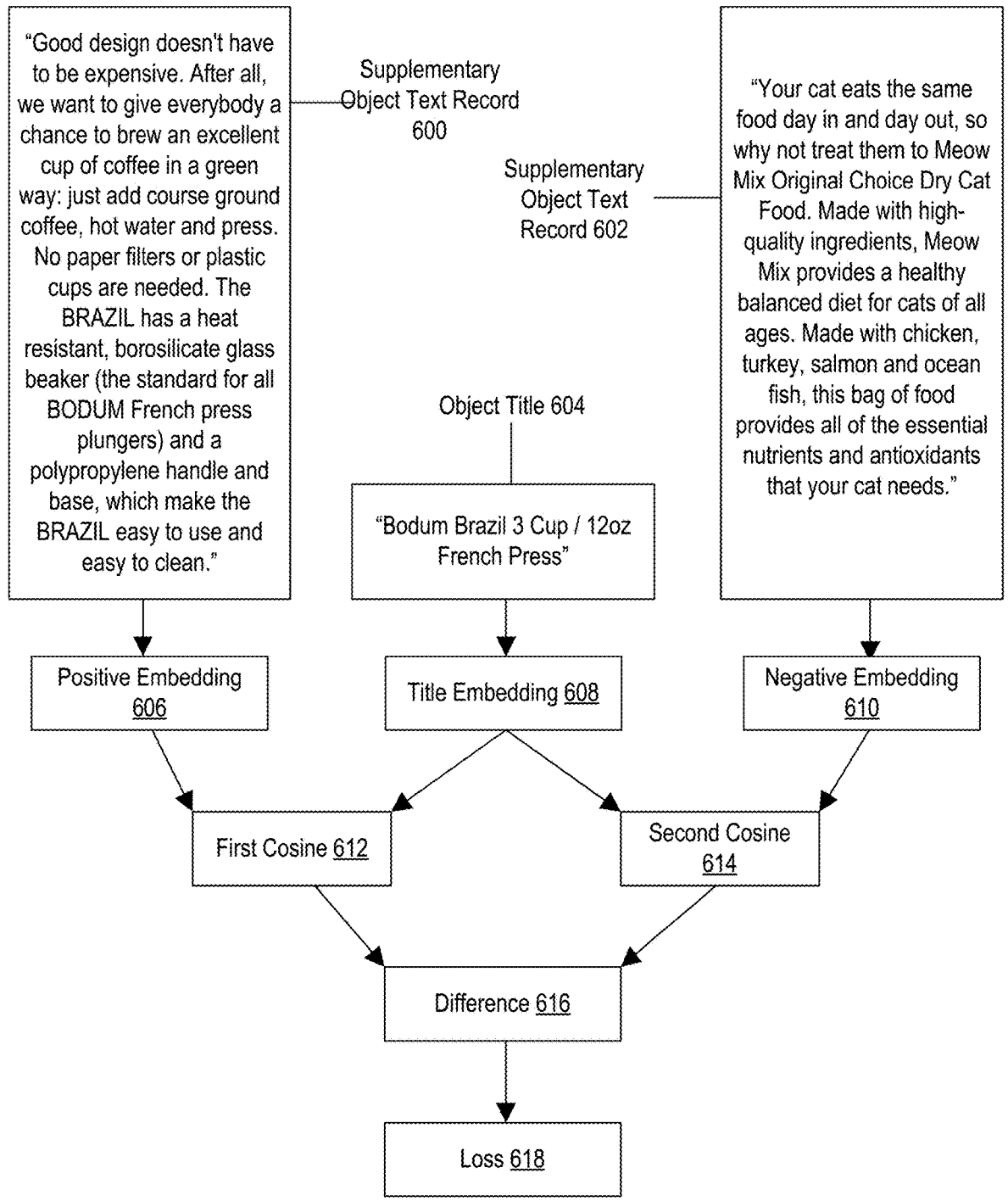
FIG. 6 is a block diagram illustrating an example of determining a triplet loss.

FIG. 6 is a block diagram illustrating an example of determining a triplet loss. As shown in the example of FIGS. 3 and 6, the training data used to fine-tune the named entity tagger 100 can include object data, and the object data can include item titles, such as the object title 604 of a "Bodum Brazil 3 Cup/12 oz French Press," and the object data can include supplementary object text records 600-602, which can be item descriptions. The supplementary object text record 600 can be, for example, a description of the object title 604, and the supplementary object text record 602 can be a randomly chosen supplementary object text record, such as a description of cat food.

As shown in the example of FIG. 6, a neural network can be used to generate embeddings, including a positive embedding 606 for the supplementary object text record 600, a title embedding 608 for the object title 604, and a negative embedding 610 for the supplementary object text record 602. The embeddings 606-610 can be used in determining a triplet loss, by for example applying the equations (1)-(4) described in connection with FIG. 5. As shown in the example of FIG. 6, applying equation (1) can result in a first cosine similarity 612 and applying equation (2) can result in a second cosine similarity 614. Furthermore, subtracting the second cosine similarity 614 from the first cosine similarity 612 can result in the difference 616, with an objective during fine-tuning being, in some embodiments, to maximize the difference 616. Then applying, for example, a sigmoid function to the difference 616 can result in the loss 618. Although not shown in the example of FIG. 6, determining a triplet loss can be performed for a plurality of object titles and a plurality of supplementary object text records, including supplementary object text records that are not descriptions. Furthermore, in some embodiments, rather than using an object title as an anchor in the triplet loss function, a different entity can be used.

Figure 7:
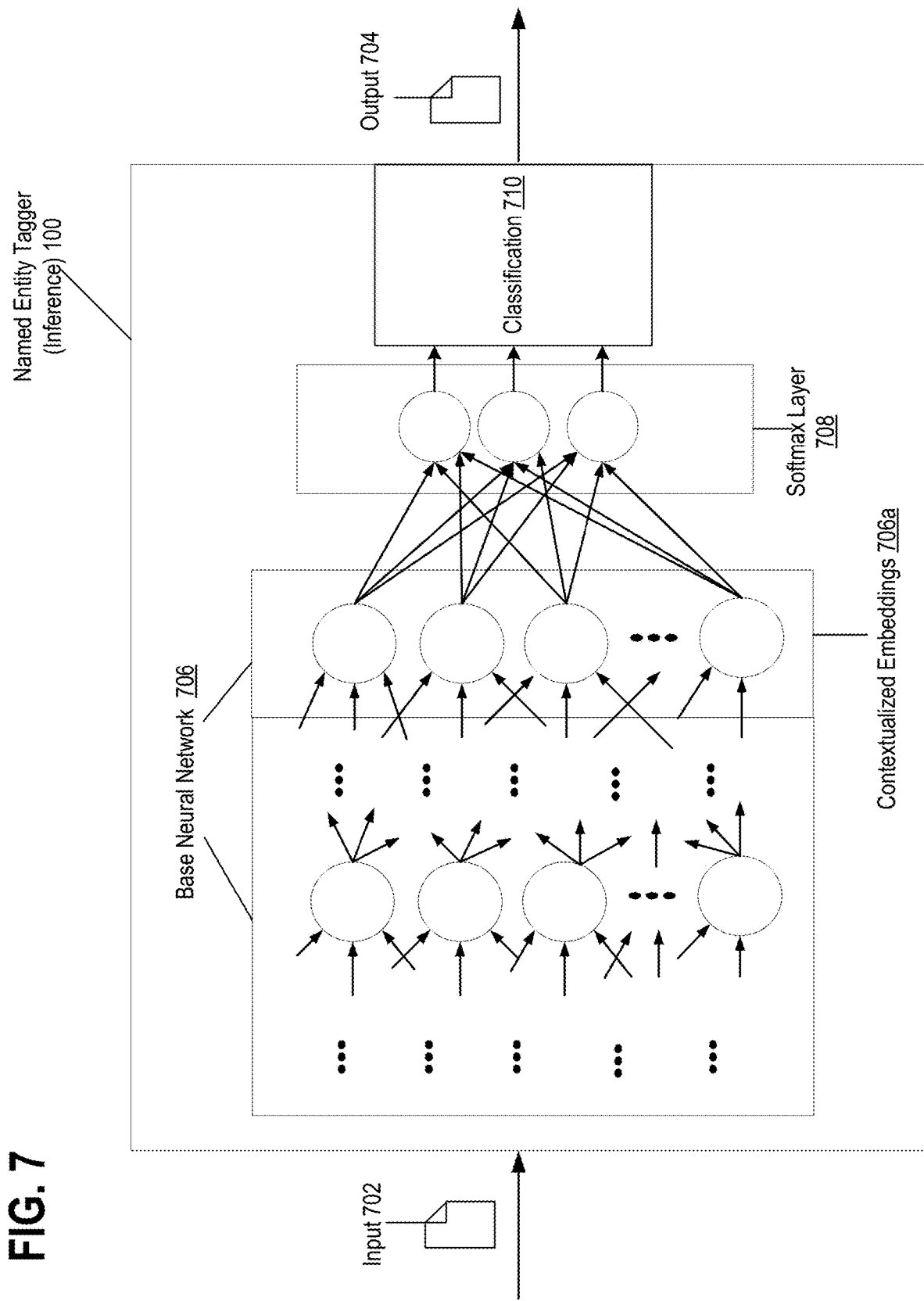
FIG. 7 illustrates a block diagram of an example named entity tagger during inference.

FIG. 7 illustrates a block diagram of an example named entity tagger 100 during inference. During inference, which can follow fine-tuning, described above in connection with FIGS. 3-6, the named entity tagger 100 can be used to predict classifications of words in text. The named entity tagger 100 of FIG. 7 can include a base neural network 706, which has a layer of contextualized word embeddings 706a, a Softmax layer 708, and a classification unit 710.

The base neural network 706 can include, for example, a BERT-based neural network with weights that have been updated to reflect the training described, for example, in connection with FIG. 3-6. The Softmax layer 708, which can be the Softmax layer described above in connection with the named entity recognition component 312 of FIG. 3, can be used to determine a likelihood that a word belongs to a category. Receiving and using the output of the Softmax layer, the classification unit 710 can infer, for each word of the input 702, what category that word belongs to. In some embodiments, the named entity tagger 100 does not use the triplet loss component 310 that can be used when the named entity tagger 100 is fine-tuning.

The named entity tagger 100 can receive an input 702. The input 702 can be text. For example, the input 702 can be a query, an internet post, such as a review on a website or a social media post, a collection of text, or any other text that the named entity tagger 100 can use to perform NER. The output 704 can include data that indicate a predicted category for one or more words of the input 702. As described above in connection with FIG. 1, the format of the output 704 can depend on the entity that the named entity tagger 100 is sending the output 704 to. For example, the output 704 can be in the form of a table, a data structure, or as text that includes indications regarding what category one or more words of the input 702 belong to. In some embodiments, the named entity tagger 100 can have a different architecture during inference than the architecture depicted in the example of FIG. 7.

Figure 8:
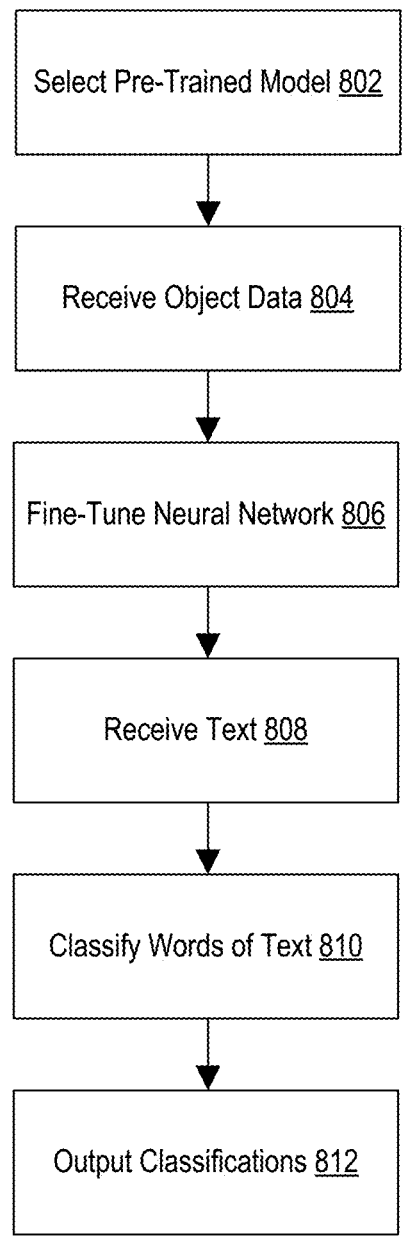
FIG. 8 is a flowchart illustrating an example method for performing aspects of the present disclosure.

FIG. 8 is a flowchart illustrating an example method 800 for performing aspects of the present disclosure. The method 800 can be performed, for example, by the named entity tagger 100 or a user of the named entity tagger 100. The method 800 can begin by selecting a pre-trained model (step 802). For example, a neural network can be selected that has been pre-trained to receive text, convert the text to embeddings, and to process the embeddings. The architecture of the neural network can vary depending on the embodiment. In some examples, a BERT-based neural network can be selected. In some examples, the BERT Base model can be used, and in some examples the BERT Large model can be used.

In the example shown, the named entity tagger can receive object data (step 804). The object data can include training data, described above in connection with FIG. 3-6, for fine-tuning the named entity tagger 100. The object data can include, for example, a plurality of object titles and a plurality of supplementary object text records. The supplementary object text records can include any text. For example, the supplementary object text records can include descriptions of objects, summaries of objects, features of objects, questions or answers related to objects, or any other text or collection of texts. In some embodiments, the objects can be any objects that relate to a named entity. For example, in some embodiments, the objects can be products, locations, pharmaceuticals, any other objects, or other entities that can be part of NER. In some embodiments, the objects can be items, the object titles can be the titles of the items, and the supplementary object text records can include supplementary text records related to the items. In some embodiments, the supplementary object text records can come from a product catalog. In some embodiments, the named entity tagger 100 or another system can automatically parse a dataset, including, for example, a product catalog, to generate supplementary object text records.

In the example shown, the named entity tagger 100 can fine-tune the neural network (step 806). For example, the named entity tagger can fine-tune the pre-trained neural network (e.g., selected at step 802) by using the object data (e.g., received at step 804). As described above in connection with FIG. 3-6, fine-tuning the neural network can include updating the weights of the neural network to optimize a multi-task objective function that includes a combination of a triplet loss and a named entity recognition loss.

In the example shown, the named entity tagger 100 can receive text (step 808). For example, the named entity tagger 100 can receive text as part of the inference stage of NER. The text can include one or more words that are a named entity belonging to a category that the named entity tagger 100 is trained to recognize. The structure and length of the text can vary. For example, the text may be one or more well-formed sentences, the text may be a few words, or the structure of the text may be unknown. Some examples of text received by the named entity tagger 100 can include a query, an article, a book, a transcribed oral message, text received from a computing system, a collection of texts, or an internet post, such as a review of an object, a news article, a catalog, or a social media post. Furthermore, in some examples, the named entity tagger 100 can receive text from a user device, for example from a user device submitting a query or writing a review, or from a system that collects texts and transmits the texts to the named entity tagger 100. In some embodiments, the named entity tagger 100 can generate embeddings that correspond to the text and that can be used in a neural network.

In the example shown, the named entity tagger 100 can classify one or more words of the text (step 810). For example, the embeddings corresponding to words of the text can be processed by one or more layers of a trained and fine-tuned neural network. Then the named entity tagger 100 can use, for example, a Softmax layer to determine one or more likelihoods that one or more words are a named entity. Based on those likelihoods, the named entity tagger 100 can, for example, classify each word of the text as belonging to a category or as not belonging to any category. In some embodiments, moreover, the named entity tagger 100 can group and classify one or more words as belonging to the same entity within a category. For example, if the text includes the phrase "French press," the named entity tagger 100 can group "French" and "press" together and label them as belonging to one entity in an ITEM category, as described above in connection with FIG. 1.

In the example shown, the named entity tagger 100 can output the classification (step 812). For example, the named entity tagger 100 can output data that indicates whether a word in the text belongs to a category and which category it belongs to. As described above, depending on the embodiment, the form in which the classification is output can vary. For example, depending on the embodiment, the output can be marked-up text indicating the classification, the output can be a JSON object or a table, or the output can be in a different format. Furthermore, as described above in connection with FIG. 2, the named entity tagger 100 can output the classification to a user, a database, another system, or elsewhere.

Referring to FIGS. 1-8 generally, it is noted that aspects of the present disclosure, including using a multi-task objective that combines a triplet loss and a named entity recognition loss, can improve precision, recall, exact matches, and accuracy on a given dataset. Based on a retail-specific dataset, and a 30% hold back test set, the approach described above improves NER performance. Specially, aspects of the present disclosure reflect an improvement of 1% in precision and recall, 2% in exact matches, and 0.3% in accuracy when performing NER relative to a model that only uses a BERT base (e.g., a model that fine-tunes a BERT-based neural network only to perform NER). Table 1 shows the results:

TABLE 1

Comparison of Test Results between BERT-Multitask-Triplet with BERT-base

|  | Precision | Recall | Exact Matches | Accuracy |
|---|---|---|---|---|
| BERT-Multitask-Triplet | 78% | 63% | 43% | 85% |
| BERT-base | 77% | 62% | 41% | 84.7% |

The percentage of exact matches can indicate the percentage of times when all the labels in a sentence are correct. When considering a dataset with a large amount of text, and when considering that many named entities may be included in such text, the improvements shown above in Table 1 can be significant. These improvements can result in, among other things, more accurate natural language understanding and response, savings in terms of computing time and resources, and more efficient execution of NLP and artificial intelligence tasks.

Figure 9:
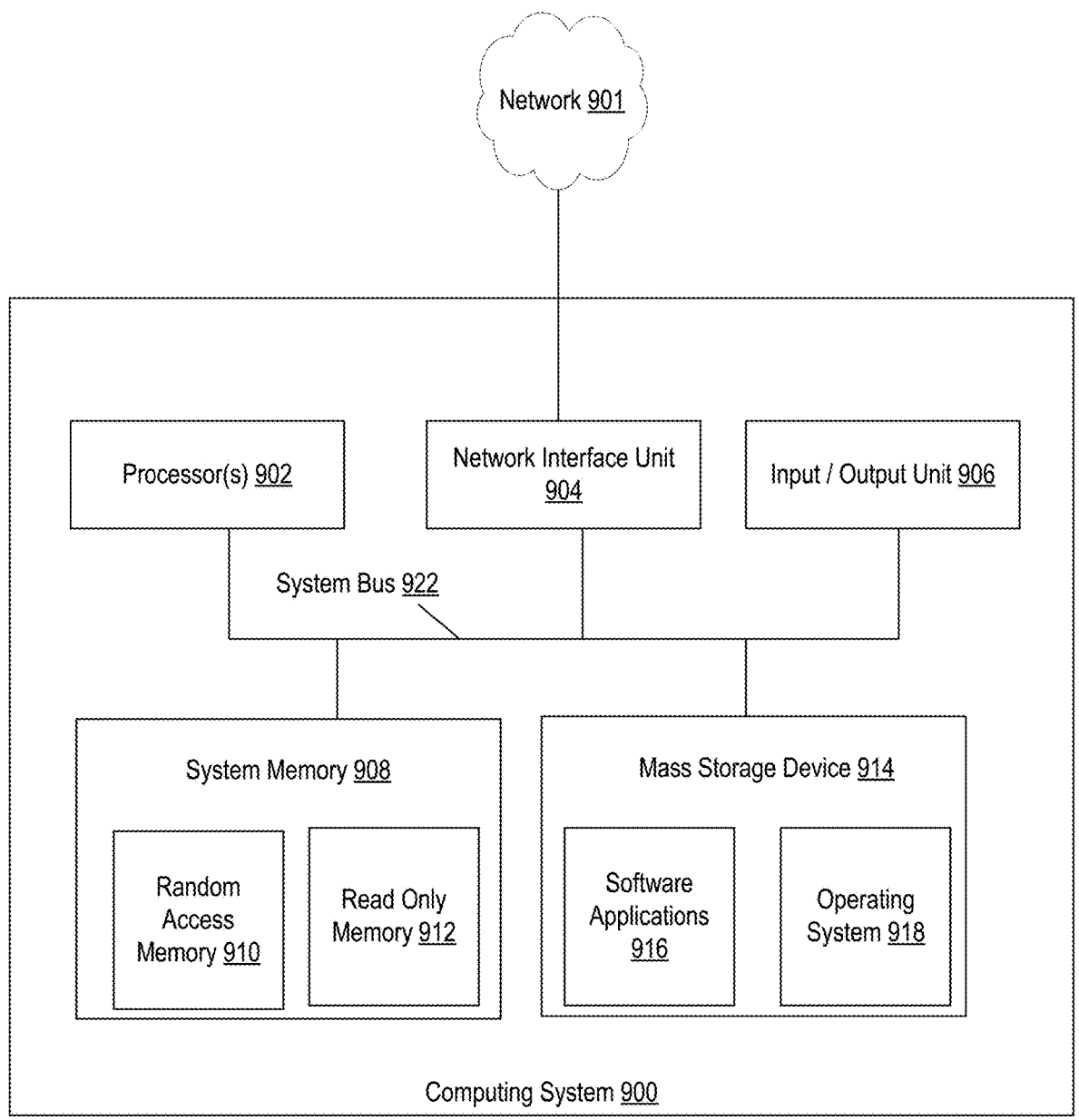
FIG. 9 illustrates an example block diagram of a computing system.

FIG. 9 illustrates an example block diagram of a virtual or physical computing system 900. One or more aspects of the computing system 900 can be used to implement one or more aspects of the present disclosure.

In the embodiment shown, the computing system 900 includes one or more processors 902, a system memory 908, and a system bus 922 that couples the system memory 908 to the one or more processors 902. The system memory 908 includes RAM (Random Access Memory) 910 and ROM (Read-Only Memory) 912. A basic input/output system that contains the basic routines that help to transfer information between elements within the computing system 900, such as during startup, is stored in the ROM 912. The computing system 900 further includes a mass storage device 914. The mass storage device 914 is able to store software instructions and data. The one or more processors 902 can be one or more central processing units or other processors.

The mass storage device 914 is connected to the one or more processors 902 through a mass storage controller (not shown) connected to the system bus 922. The mass storage device 914 and its associated computer-readable data storage media provide non-volatile, non-transitory storage for the computing system 900. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 900.

According to various embodiments of the invention, the computing system 900 may operate in a networked environment using logical connections to remote network devices through the network 901. The network 901 is a computer network, such as an enterprise intranet and/or the Internet. The network 901 can include a LAN, a Wide Area Network (WAN), the Internet, wireless transmission mediums, wired transmission mediums, other networks, and combinations thereof. The computing system 900 may connect to the network 901 through a network interface unit 904 connected to the system bus 922. It should be appreciated that the network interface unit 904 may also be utilized to connect to other types of networks and remote computing systems. The computing system 900 also includes an input/output controller 906 for receiving and processing input from a number of other devices, including a touch user interface display screen, or another type of input device. Similarly, the input/output controller 906 may provide output to a touch user interface display screen or other type of output device.

As mentioned briefly above, the mass storage device 914 and the RAM 910 of the computing system 900 can store software instructions and data. The software instructions include an operating system 918 suitable for controlling the operation of the computing system 900. The mass storage device 914 and/or the RAM 910 also store software instructions, that when executed by the one or more processors 902, cause one or more of the systems, devices, or components described herein to provide functionality described herein. For example, the mass storage device 914 and/or the RAM 910 can store software instructions that, when executed by the one or more processors 902, cause the computing system 900 to receive and execute managing network access control and build system processes.

Referring to FIGS. 1-9 generally, the disclosed computing system provides a physical environment with which aspects of the present disclosure can be performed. Specifically, a multi-tasking BERT-based NER model is disclosed that trains not only to perform NER, but also to optimize a triplet loss. By accounting for a triplet loss during training and as part of updating a neural network, aspects of the present disclosure leverage data present in supplementary text to better understand named entities and to better locate and identify named entities during inference, resulting in improvements in NER. In the retail context, for example, an enterprise can use aspects of the present disclosure to take advantage of supplementary information that the enterprise already may have about objects to better recognize those objects during NER. Furthermore, beyond the retail context, aspects of the present disclosure can be applied more broadly to other named entities that have related supplementary text.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process or method are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A method for performing named entity recognition comprising:
    receiving, by a processor, object data including a plurality of object titles and a plurality of supplementary object text records;
    by the processor, fine-tuning, using the object data, a neural network to perform named entity recognition, thereby forming a trained neural network;
    receiving, by the processor, a text input comprising a plurality of words; and
    by the processor, classifying, using the trained neural network, one or more words of the plurality of words;
    wherein fine-tuning the neural network to perform named entity recognition comprises:
        determining, by the processor, a triplet loss;
        determining, by the processor, a named entity recognition loss using a Softmax layer added to the neural network; and
        optimizing, by the processor, a multi-task objective function comprising the triplet loss and the named entity recognition loss;
    wherein classifying, using the trained neural network, the one or more words of the plurality of words comprises using the Softmax layer.

2. The method of claim 1, wherein the neural network comprises a Bidirectional Encoder Representations from Transformers (BERT) model.

3. The method of claim 1, wherein the multi-task objective function comprises a linear combination of the triplet loss and the named entity recognition loss.

4. The method of claim 1, wherein determining the triplet loss comprises:
    by the processor, generating embeddings, using the neural network, for an object title of the plurality of object titles and for two supplementary object text records of the plurality of supplementary object text records;
    calculating, by the processor, a first cosine similarity using an embedding associated with the object title and an embedding associated with a first supplementary object text record of the two supplementary object text records, wherein the first supplementary object text record is associated with the object title;
    calculating, by the processor, a second cosine similarity between the embedding associated with the object title and an embedding associated with a second supplementary object text record of the two supplementary object text records, wherein the second supplementary object text record is not associated with the object title;
    determining, by the processor, a difference between the first cosine similarity and the second cosine similarity by subtracting the second cosine similarity from the first cosine similarity; and
    applying, by the processor, a sigmoid function to the difference between the first cosine similarity and the second cosine similarity to calculate the triplet loss.

5. The method of claim 4, wherein optimizing the multi-task objective function comprises increasing the difference between the first cosine similarity and the second cosine similarity.

6. The method of claim 4, wherein fine-tuning the neural network to perform named entity recognition comprises determining a triplet loss for each object title of the plurality of object titles.

7. The method of claim 1, wherein the plurality of supplementary object text records includes descriptions of objects associated with the plurality of object titles.

8. The method of claim 1, wherein fine-tuning the neural network to perform named entity recognition comprises backpropagating the triplet loss and the named entity recognition loss.

9. The method of claim 1,
    wherein the object data includes item data received from a retail item database;
    wherein the plurality of object titles includes a plurality of item titles; and
    wherein the plurality of supplementary object text records includes a plurality of item text records.

10. The method of claim 9,
    wherein the plurality of item text records includes a plurality of item descriptions.

11. The method of claim 10,
    wherein the plurality of item titles includes a first item;
    wherein the plurality of item descriptions includes a first item description and a second item description;
    wherein the first item description is associated with the first item;
    wherein the second item description is not associated the first item; and
    wherein determining the triplet loss comprises applying a triplet loss function using the first item as an anchor, the first item description as a true input, and the second item description as a false input.

12. The method of claim 10, wherein the set of predefined categories includes an item category.

13. The method of claim 1,
    wherein classifying, using the trained neural network, one or more words of the plurality of words comprises predicting, for each of the one or more words, a category that the word belongs to; and
wherein the category is a predefined category belonging to a set of predefined categories.

14. The method of claim 1, wherein optimizing the multi-task objective function comprises iteratively adjusting one or more weights of the neural network.

15. The natural language processing service of claim 14, wherein the natural language processing subsystem performs, using the classification, sentiment analysis or generates, using the classification, a query response.

16. The method of claim 1, wherein the text input is a review, a user query, an internet post, an article, or a collection of texts.

17. The method of claim 16, further comprising outputting, by the processor, a classification of the one or more words of the plurality of words to one or more of a natural language processing subsystem or an analytics system.

18. The method of claim 17, wherein the natural language processing subsystem performs sentiment analysis or generates, based on the classification, a response to the text input.

19. The method of claim 17, wherein the neural network comprises a Bidirectional Encoder Representations from Transformers (BERT) model.

20. The method of claim 17,
wherein the multi-task objective function comprises a linear combination of the triplet loss and the named entity recognition loss; and
wherein optimizing the multi-task objective function comprises iteratively adjusting one or more weights of the neural network.

21. The method of claim 17, wherein the item data is received from an item catalog.

22. A natural language processing service comprising:
a named entity tagger comprising a processor and a memory storing instructions; and
a natural language processing subsystem communicatively coupled with the named entity tagger;
wherein the instructions, when executed by the processor, cause the named entity tagger to:
receive object data including a plurality of object titles and a plurality of supplementary object text records;
fine-tune, using the object data, a neural network to perform named entity recognition;
receive a text input comprising a plurality of words;
classify, using the trained neural network, one or more words of the plurality of words; and
output, to the natural language processing subsystem, a classification of the one or more words;
wherein fine-tuning the neural network to perform named entity recognition comprises:
determining a triplet loss;
determining a named entity recognition loss; and
optimizing a multi-task objective function comprising the triplet loss and the named entity recognition loss.

23. A method for training a neural network to detect items in text comprising:
receiving, by the processor, item data including a plurality of item titles and a plurality of item descriptions;
by the processor, generating embeddings, using the neural network, for each item title of the plurality of item titles and for each item description of the plurality of item descriptions;
applying, by the processor, a triplet loss function to each of the plurality of item titles to obtain a triplet loss by, for each item title:
calculating, by the processor, a first cosine similarity between an embedding associated with the item title and an embedding associated with an item description of the plurality of item descriptions that is associated with the item title;
calculating, by the processor, a second cosine similarity between the embedding associated with the item title and an embedding associated with an item description of the plurality of item descriptions that is not associated with the item title;
determining, by the processor, a difference between the first cosine similarity and the second cosine similarity by subtracting the second cosine similarity from the first cosine similarity; and
applying, by the processor, a sigmoid function to the difference between the first cosine similarity and the second cosine similarity;
by the processor, determining, using the embeddings and the item data, a named entity recognition loss; and
optimizing, by the processor, a multi-task objective function comprising the triplet loss and the named entity recognition loss.

24. A method for performing named entity recognition comprising:
receiving, by the processor, object data including a plurality of object titles and a plurality of supplementary object text records;
by the processor, fine-tuning, using the object data, a neural network to perform named entity recognition, thereby forming a trained neural network;
receiving, by the processor, a text input comprising a plurality of words; and
by the processor, classifying, using the trained neural network, one or more words of the plurality of words;
wherein fine-tuning the neural network to perform named entity recognition comprises:
determining, by the processor, a triplet loss;
determining, by the processor, a named entity recognition loss; and
optimizing, by the processor, a multi-task objective function comprising the triplet loss and the named entity recognition loss
wherein the object data includes item data received from a retail item database;
wherein the plurality of object titles includes a plurality of item titles, the plurality of item titles including a first item; and
wherein the plurality of supplementary object text records includes a plurality of item text records including a plurality of item descriptions, the plurality of item descriptions including a first item description associated with the first item and a second item description that is not associated with the first item;
wherein determining the triplet loss comprises applying a triplet loss function using the first item as an anchor, the first item description as a true input, and the second item description as a false input.

25. The method of claim 24,
wherein the text input is a query received from a user; and
wherein the method further comprises:
generating a response using one or more classifications of the one or more words of the plurality of words; and
outputting the response to the user.

26. The method of claim 24,
wherein classifying, using the trained neural network, one or more words of the plurality of words comprises predicting a category for at least some of the one or more words; and
wherein the category is a predefined category belonging to a set of predefined categories, the set of predefined categories including an action category.

\* \* \* \* \*